United States Patent [19]

Ulrich et al.

[11] Patent Number: 5,768,047
[45] Date of Patent: Jun. 16, 1998

[54] CARTRIDGE LIBRARY WITH DUEL-SIDED ROTATABLE SPIT HAVING LATCH MEMBER EXTENDING THROUGH APERTURE IN CIRCULAR TOOTHED END WALL

[75] Inventors: Michael Ulrich. Boulder; John F. Ellis. Louisville, both of Colo.

[73] Assignee: Exabyte Corporation. Boulder, Colo.

[21] Appl. No.: 575,135

[22] Filed: Dec. 19, 1995

[51] Int. Cl.$^6$ .................................................. G11B 15/68
[52] U.S. Cl. ............................................. 360/92; 242/337
[58] Field of Search .................. 360/92, 98.04–98.06; 369/34, 36; 242/337, 337.1

[56] References Cited

U.S. PATENT DOCUMENTS

| | | | |
|---|---|---|---|
| 2,118,991 | 5/1938 | Turechek et al. | 60/468 |
| 3,353,860 | 11/1967 | Meissner | 294/100 |
| 3,370,213 | 2/1968 | Rose | 318/513 |
| 3,467,392 | 9/1969 | Williams | 369/80 |
| 3,534,993 | 10/1970 | LeVesque, Sr. | 81/3.8 |
| 3,620,095 | 11/1971 | Dane | 74/469 |
| 3,718,362 | 2/1973 | Butz | 294/112 |
| 4,299,532 | 11/1981 | Bouwmeester | 414/750 |
| 4,730,861 | 3/1988 | Spencer | 294/86.4 |
| 4,836,621 | 6/1989 | Teranishi | 360/98.05 |
| 4,972,277 | 11/1990 | Sills et al. | 360/92 |
| 4,979,060 | 12/1990 | Tanigawa | 360/92 |
| 4,981,409 | 1/1991 | Hirose et al. | 414/225 |
| 4,984,106 | 1/1991 | Herger et al. | 360/92 |
| 5,019,927 | 5/1991 | Simone | 360/92 |
| 5,021,902 | 6/1991 | Ishikawa et al. | 360/92 |
| 5,043,962 | 8/1991 | Wanger et al. | 369/36 |
| 5,056,844 | 10/1991 | Takabayashi | 294/106 |
| 5,059,772 | 10/1991 | Younglove | 360/92 |
| 5,065,265 | 11/1991 | Pierrat | 360/92 |
| 5,103,986 | 4/1992 | Marlowe | 211/41 |
| 5,108,246 | 4/1992 | Baur | 414/223 |
| 5,164,928 | 11/1992 | Oliver et al. | 360/92 |
| 5,226,779 | 7/1993 | Yeakley | 414/753 |
| 5,233,844 | 8/1993 | Knippscheer et al. | 62/440 |
| 5,235,474 | 8/1993 | Searle | 360/92 |
| 5,237,467 | 8/1993 | Marlowe | 360/92 |
| 5,277,534 | 1/1994 | Anderson et al. | 360/92 |
| 5,278,708 | 1/1994 | Apple et al. | 360/92 |
| 5,285,333 | 2/1994 | Barr et al. | 360/92 |
| 5,303,034 | 4/1994 | Carmichael et al. | 356/375 |
| 5,341,258 | 8/1994 | Chalmers et al. | 360/92 |
| 5,415,471 | 5/1995 | Dalziel | 360/92 |
| 5,416,653 | 5/1995 | Marlowe | 360/92 |
| 5,487,579 | 1/1996 | Woodruff | 294/115 |
| 5,546,315 | 8/1996 | Kleinschnitz | 369/34 |

OTHER PUBLICATIONS

"EXB–10 Catridge Handling Subsystem", Product Description and Specification, published by EXABYTE Corporation, Boulder, Colorado, Feb. 1992.
*EXB–120 Cartridge Handling Subsystem User's Manual,* Rev. 5, Apr. 1992, pp. 2–12, and 2–13.
*ExB–120 8MM Cartridge Handling Subsystem Specifications,* Jan. 1993.

*Primary Examiner*—Craig A. Renner
*Attorney, Agent, or Firm*—Nixon & Vanderhye, P.C.

[57] ABSTRACT

An automated cartridge library (30) includes a rotatable spit (100) which has only two mounting surfaces for engaging two respective cartridge magazines (110A, 110B). The library includes a cartridge transport mechanism (80) for selectively engaging cartridges and transporting cartridges between a presented one of the magazines and input/output (I/O) drives (40A, 40B) within the confines of a library housing. The spit (100) has a spit width (SW) which is essentially 0.6 of a smallest dimension (X) of the housing. The spit comprises two tray compartments (130A, 130B), each tray compartment being provided with ribs (144, 154) extending in two dimensions for securing and properly locating its respective magazine. The spit is provided with a magazine latch mechanism (170) which includes biased magazine-capturing protrusions (220A) retained in a pulley member (143).

8 Claims, 6 Drawing Sheets

CARTRIDGE LIBRARY WITH DUEL-SIDED ROTATABLE SPIT HAVING LATCH MEMBER EXTENDING THROUGH APERTURE IN CIRCULAR TOOTHED END WALL

BACKGROUND

1. Field of Invention

This invention pertains to automated libraries for handling units of data storage medium, such as magnetic tape cartridges.

2. Related Art and Other Considerations

Magnetic tape cartridges have proven to be an efficient and effective medium for data storage, including computer back-up. Large computer systems can utilize numerous cartridges for storage purposes, and may require a plurality of drives for inputting/outputting data to the cartridges. To this end, automated libraries for cartridges have been proposed. The following United States patents, all commonly assigned herewith and incorporated herein by reference, disclose various configurations of automated cartridge libraries, as well as subcomponents thereof (including cartridge engagement/transport mechanisms and storage racks for housing cartridges):

U.S. Pat. No. 4,984,106 to Herger et al., entitled "CARTRIDGE LIBRARY SYSTEM AND METHOD OF OPERATION THEREOF";

U.S. Pat. No. 4,972,277 to Sills et al., entitled "CARTRIDGE TRANSPORT ASSEMBLY AND METHOD OF OPERATION THEREOF";

U.S. Pat. No. 5,059,772 to Younglove, entitled "READING METHOD AND APPARATUS FOR CARTRIDGE LIBRARY";

U.S. Pat. No. 5,103,986 to Marlowe, entitled "CARTRIDGE RACK"; and,

U.S. Pat. No. 5,237,467 and 5,416,653 to Marlowe, entitled "CARTRIDGE HANDLING APPARATUS AND METHOD WITH MOTION-RESPONSIVE EJECTION".

Some prior art cartridge libraries have a carrousel-type structure which rotates to present selectively three or more sets of cartridges to a cartridge handling apparatus. Examples include U.S. Pat. No. 4,981,409 to Hirose et al.; U.S. Pat. No. 5,285,333 to Barr et al.; and U.S. Pat. No. 5,065,265 to Pierrat.

U.S. Pat. No. 5,237,467 to Marlowe shows a cartridge handling apparatus which is mounted to travel on a vertical track in a housing of a library such as that marketed as model EXB-10 Cartridge Library by Exabyte Corporation. The housing also includes a device mounting wall. The device mounting wall has a stationary rack mount fastened thereto. In use the rack mount engages a cartridge rack, the cartridge rack in turn having cells for ten magnetic data cartridges. The device mounting wall also has a drive mounting cavity which receives a magnetic tape drive. The capacity of the model EXB-10 Cartridge Library is thus ten magnetic data cartridges.

While the model EXB-10 Cartridge Library is advantageously small, its capacity for data cartridges is limited. Real estate within the library housing is scarce. What is needed is enhanced cartridge capacity for the library without enlarging the library housing.

SUMMARY

An automated cartridge library includes a rotatable spit which has only two mounting surfaces for engaging two respective cartridge magazines. The library includes a cartridge transport mechanism for selectively engaging cartridges and transporting cartridges between a presented one of the magazines and an input/output drive within the confines of a library housing. The rotatable spit has a spit width which is essentially 0.6 of a smallest dimension of the housing. The spit comprises two tray compartments, each tray compartment being provided with ribs extending in two dimensions for affording stability to the magazine.

The rotatable spit is provided with a magazine latch mechanism. Concerning the latch mechanism, the spit has two apertures provided in a one of its end walls which serves as a toothed pulley. A magazine-capturing protrusion extends through each end wall aperture, the protrusions being biased to contact the magazine upon insertion of a magazine into respective tray compartments of the spit. Each magazine-capturing protrusion is formed on a corresponding one of two elongated latch members. The end wall also has attached thereto two elongated spring members which serve to bias the latch members toward the inserted magazine.

Each tray compartment of the spit has opposing sidewalls and opposing end walls, with a plurality of the sidewalls and end walls having ribs formed thereon for providing a recessed engagement of the cartridge magazine.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
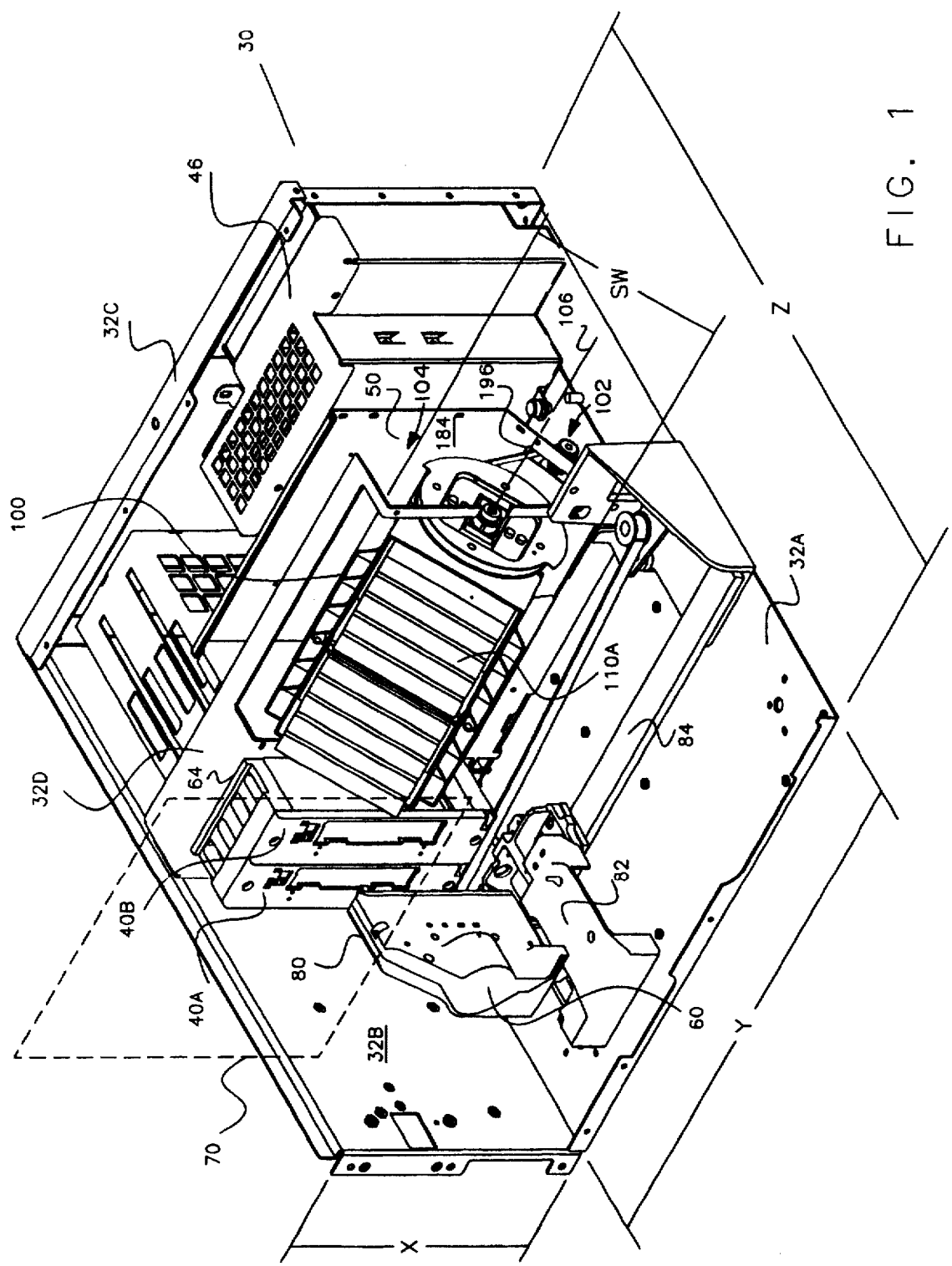
FIG. 1 is a front perspective view, with exterior housing broken away, of a cartridge library according to an embodiment of the present invention.
Figure 2:
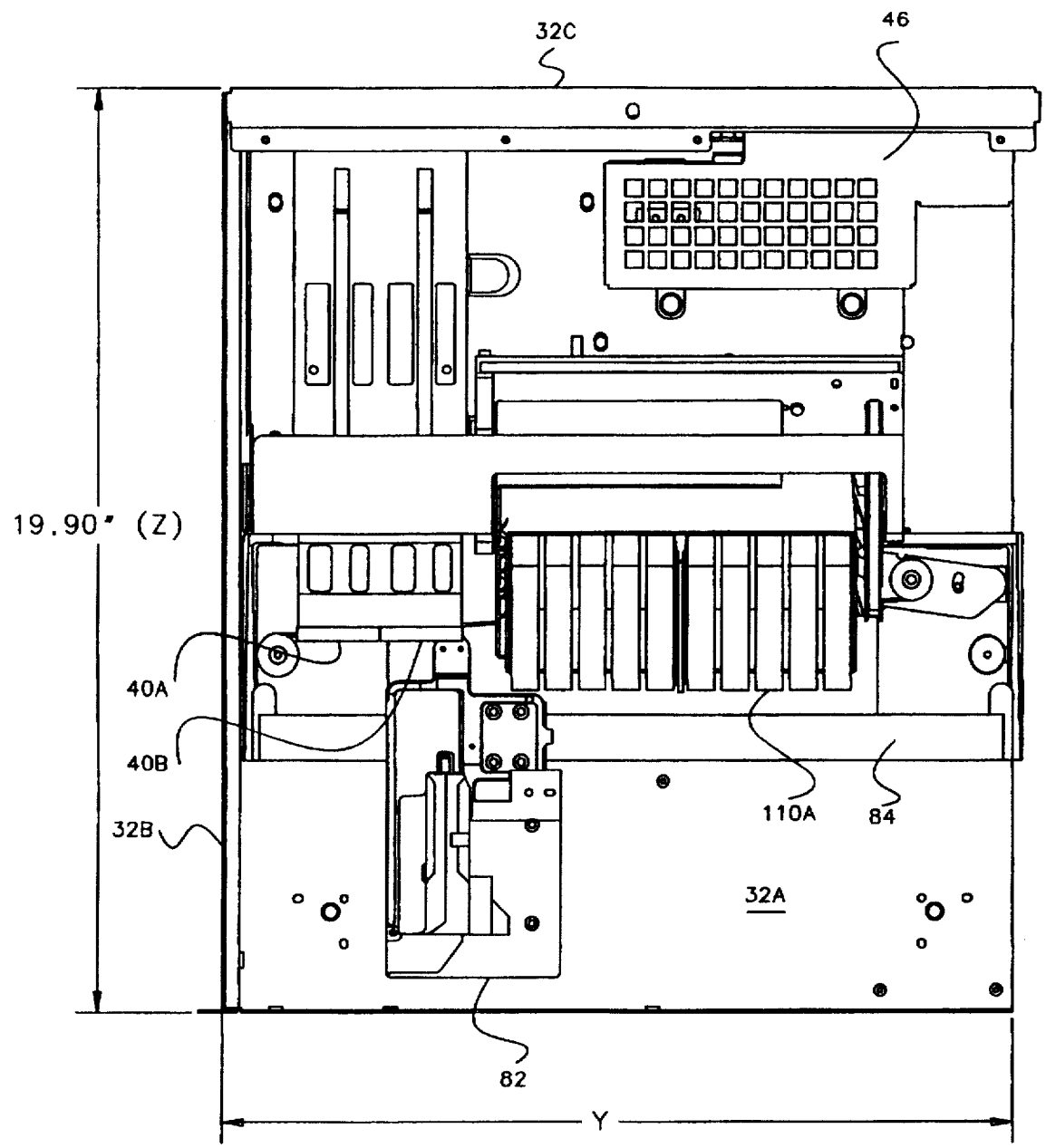
FIG. 2 is a top view, with exterior housing broken away, of the cartridge library of FIG. 1.

FIG. 1 shows internal portions of a cartridge library 30 (e.g., portions of library 30 with an unillustrated cover housing removed). Library 30 has a frame which includes a bottom or base plate 32A; a left end plate 32B; a back plate 32C; an unillustrated right end plate; and, an unillustrated top plate. At least partially extending between left end plate 32B and the right end plate is partition plate 32D.

Library 30 includes a pair of magnetic tape drives 40A and 40B; a power supply enclosure 46; rotatable cartridge storage assembly 50; and, a cartridge transport device 60 for transporting cartridges between storage assembly 50 and the drives 40A, 40B.

Drives 40A, 40B are preferably helical scan drives of a type such as the EXB-8500 and EXB-8505 family of drives produced by Exabyte Corporation. Drives 40A, 40B extend from back plate 32C through opening 64 in partition 32D, with front bezels of drives 40A, 40B lying in a presentation plane 70.

Power supply enclosure 46 is secured to back plate 32C between bottom plate 32A and the top plate. Power supply enclosure 46 is sized suitably to accommodate rotation of cartridge storage assembly 50 within a small frame.

Cartridge transport device 60 has an active element known as a cartridge picker or gripper 80 which is mounted on a transport frame 82. Transport frame 82 translates along a guide bar or linear bearing 84, so that transport frame 82 enables gripper 80 to travel along guide bar 84 in a direction Y. Transport frame 82 also enables gripper 80 to move in direction Z in order to load and extract cartridges both from drives 40A, 40B and from cartridge storage assembly 50. An example of suitable structures for transport frame 82 is provided in U.S. Pat. No. 5,237,467 to Marlowe, entitled "CARTRIDGE HANDLING APPARATUS AND METHOD WITH MOTION-RESPONSIVE EJECTION", which is incorporated herein by reference.

Figure 3:
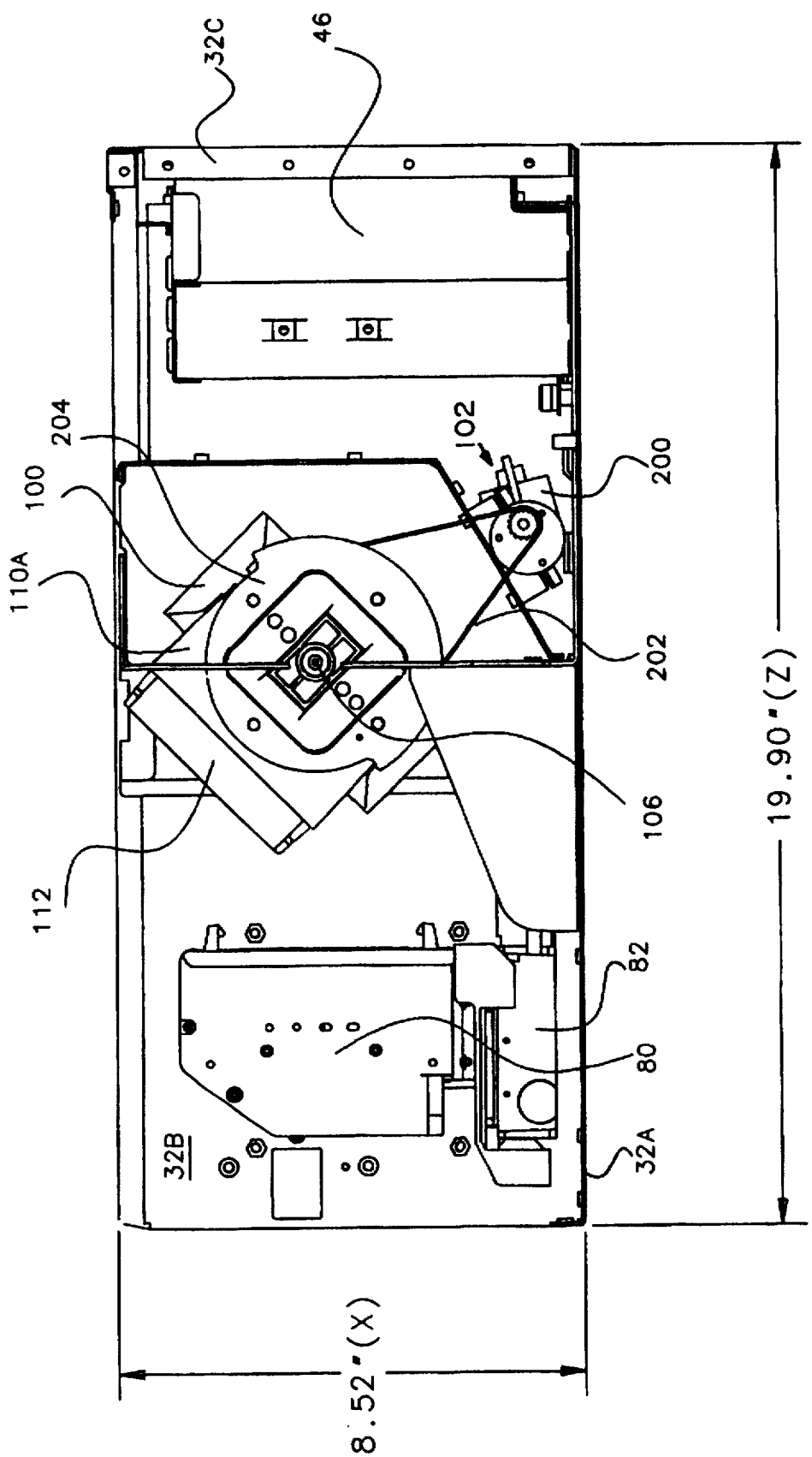
FIG. 3 is an end view, with exterior housing broken away, of the cartridge library of FIG. 1.
Figure 4:
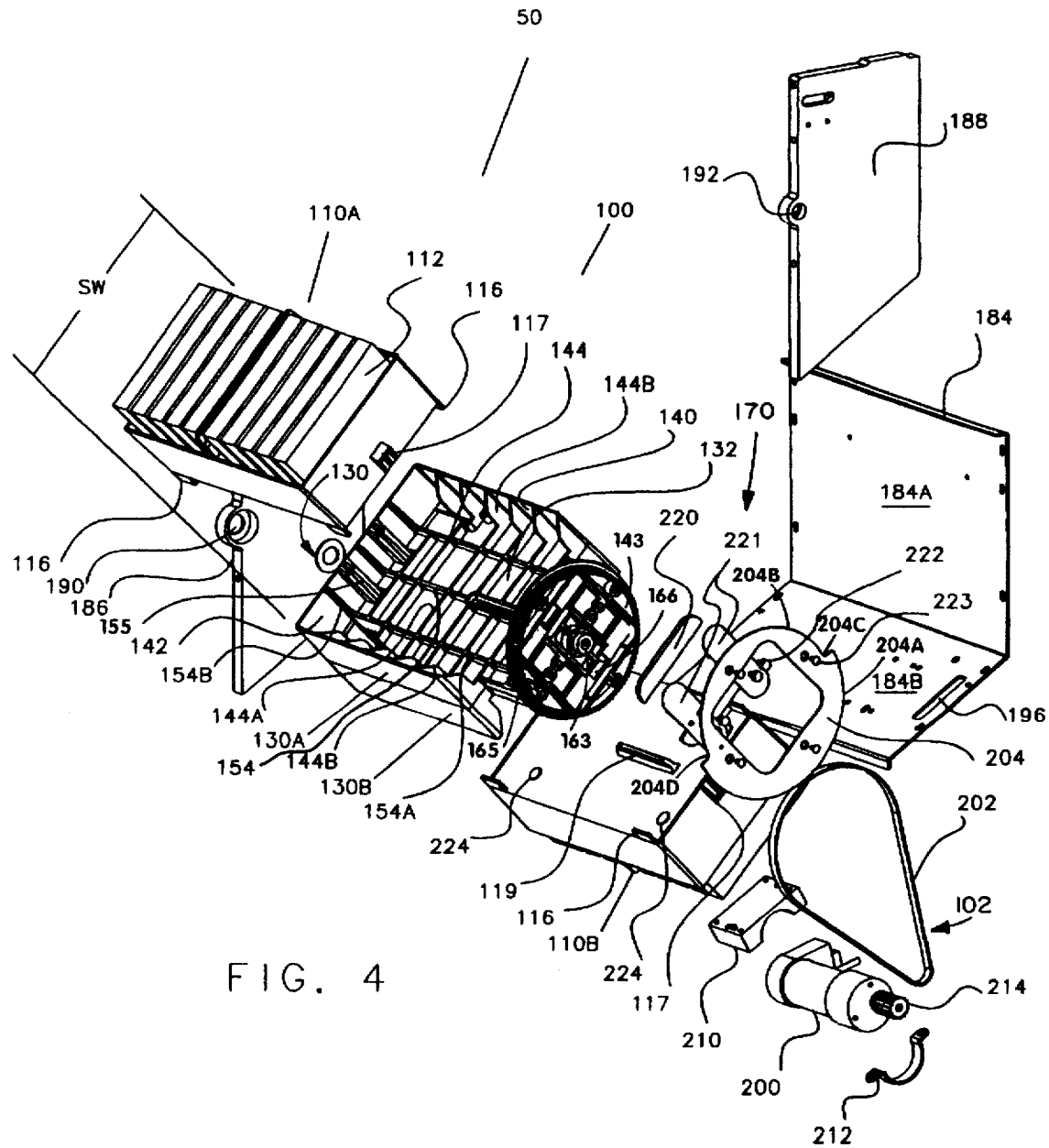
FIG. 4 is an exploded, end perspective view of a storage assembly portion of the cartridge library of FIG. 1.
Figure 5:
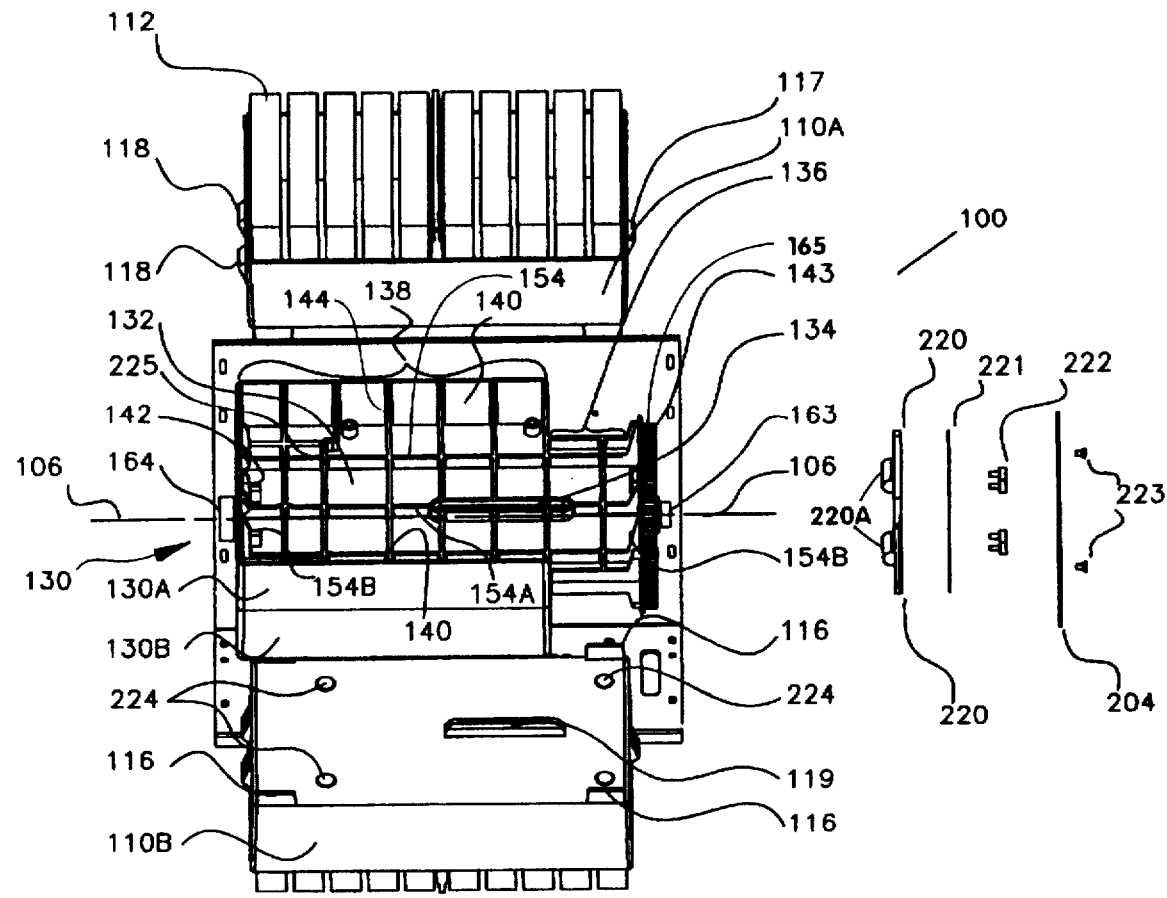
FIG. 5 is an exploded, front perspective view of a storage assembly portion of the cartridge library of FIG. 1.

As shown in more detail in FIG. 4 and FIG. 5, cartridge storage assembly 50 comprises a rotatable spit 100; a rotational drive system 102; and a storage enclosure 104. By virtue of drive system 102, spit 100 rotates about a spit rotational axis 106 (see FIG. 1, FIG. 3, and FIG. 5). Spit rotational axis 106 is parallel to dimension Y.

Spit 100 is a bilateral tray which engages two cartridge magazines or racks 110A, 110B on opposite sides thereof. Each cartridge magazine 110A 110B has ten cells for accommodating a corresponding ten magnetic tape data cartridges 112 therein. Cartridge magazines 110A, 110B are identical to those disclosed in United States patent application Ser. No. 08/468,007 for CARTRIDGE RACK AND LIBRARY FOR ENGAGING SAME, filed Jun. 6, 1995. Magazines 110A, 110B have features of prior magazines, including crown ramps 117; feet ramps 118 (see FIG. 5); stabilizing keel or fin 119; and elevating feet 116.

As indicated above, spit 100 is a two-sided tray comprising two tray compartments 130A, 130B formed back-to-back. Tray compartments 130A, 130B are preferably formed integrally, but alternatively can be assembled together. Each tray compartment 130A, 130B has a tray floor 132. Taken together, tray floors 132 of tray compartments 130A, 130B form a spit center wall, with the floors 132 then being considered sides of the center wall. Each tray floor 132 has an elongated slot 134 (also known as the keel slot) for receiving magazine stabilizing keel or fin 119 (see FIG. 5).

As seen in FIG. 5, at their right ends the tray floor 132 of each tray compartment 130A, 130B has a tray neck portion 136 of narrower width than the remainder or body portion 138 of the compartments 130A, 130B. Tray body portion 138 has two opposing tray side walls 140 and tray body end wall 142 (see FIG. 4) provided around a perimeter of tray floor 132 and extending orthogonally therefrom. Tray neck portion 136 similarly has a tray neck end wall orthogonally extending from tray floor 132.

Integrally formed with tray floor 132 and tray side walls 140 are a plurality (six) of tray lateral ribs 144. Each tray lateral rib 144 includes a floor-extending spine portion 144A and side wall-extending rib portions 144B. At their tops, side wall-extending rib portions 144B are tapered inwardly (decreasing in height with respect to floor 132 from side wall 140 to the tray interior). Tray floor 132 likewise has a plurality (three) of tray longitudinal ribs 154 which extend from tray neck end wall to tray body end wall 142. Analogously to lateral ribs 144, each longitudinal rib 154 includes a floor-extending spine portion 154A and end wall-extending rib portions 154B. At end wall 142, tops of end wall-extending rib portions 154B are tapered inwardly in the same manner as rib portions 144B. At the tray neck end wall which is opposite end wall 142, the end wall-extending rib portions 154B are tapered along their entire length to facilitate insertion of magazine 110A, 110B into tray 130.

Each body end wall 142 is provided (between adjacent ones of the three body end wall-extending rib portions 154B) with feet ramp-accommodating members 155 for accommodating feet ramps 118 of magazines 110A, 110B.

Figure 6:
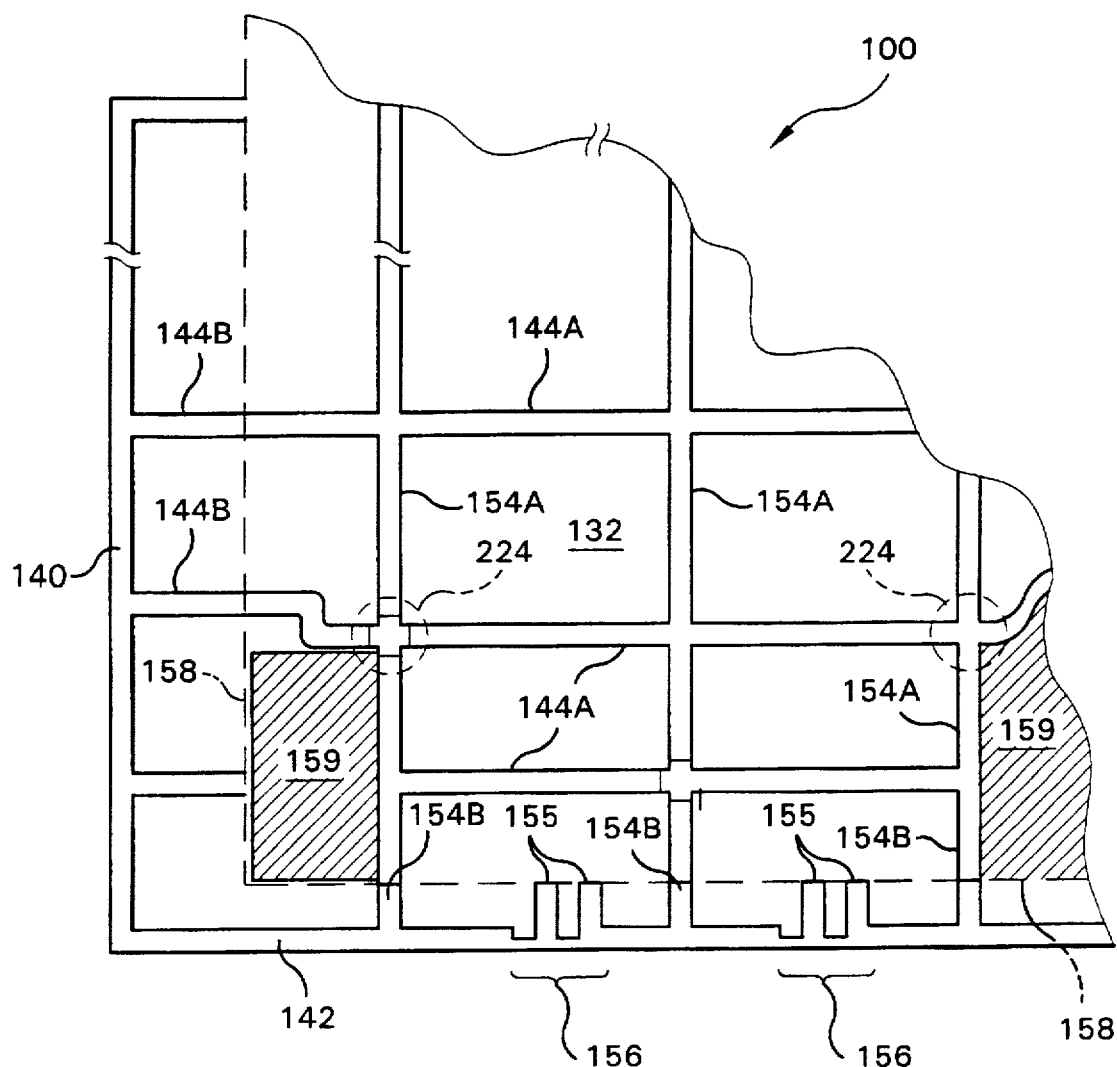
FIG. 6 is a top view of a portion of a rotatable spit of the cartridge library of FIG. 1.
Figure 7:
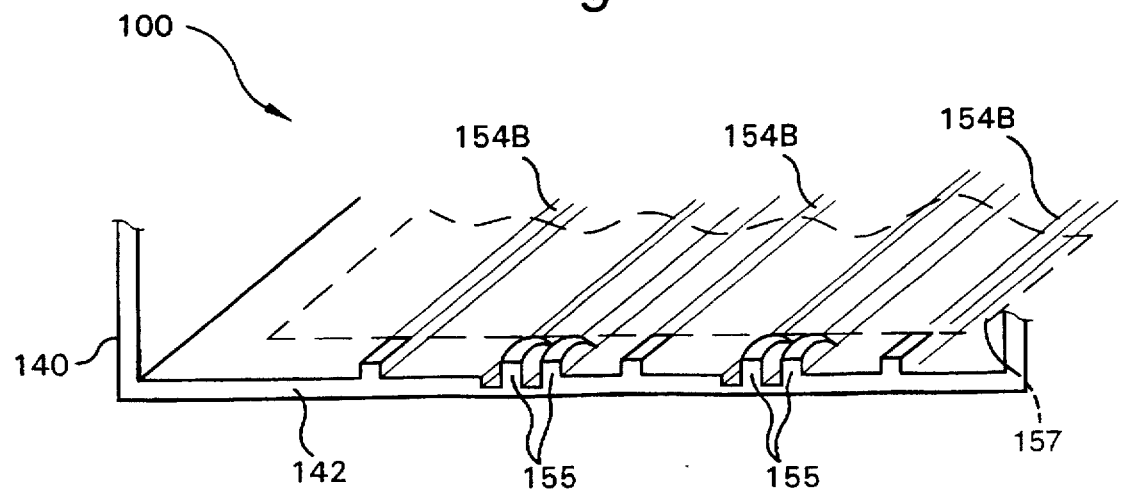
FIG. 7 is a perspective end view of a portion of the rotatable spit of FIG. 6.

As shown in FIG. 6 and FIG. 7, feet ramp-accommodating members 155 are formed in two pairs on end wall 142. Each pair of members 155 is formed in a grooved region 156 of end wall 142. As shown in FIG. 6, the thickness of end wall 142 is less in groove regions 156 than elsewhere. Tops of members 155 lie coplanarly with non-tapered ribs 154B, as indicated by imaginary magazine end plane 157 shown in FIG. 7. However, back surfaces of members 155 abruptly terminate into the depth of groove regions 156. A distance between tray floor 132 and back termination surfaces of members 155 is sized to snugly accommodate feet ramps 118 of cartridge magazine 110A, 110B.

Spine portions 144A and 154A of lateral ribs 144 and longitudinal ribs 154 serve to provide structural rigidity to spit 100 and to elevate magazines 110A, 110B with respect to floor 132. Ribs 144B and 154B also provide rigidity, but additionally serve to space magazine 110 away from spit walls 140, 142, respectively. FIG. 6 shows (in broken line labeled 158) an outer perimeter of cartridge magazine 110A, 110B rack 110. Thus, spit 100 includes means for providing a recessed engagement of cartridge magazine 110A, 110B. Moreover, rib portions 144B, 154B also serve to centrally position magazines 110A, 110B within respective tray compartments 130A, 130B.

Tray floor 132 is provided with a pair of rectangular apertures 159 near the intersection of each tray side wall 140 and tray end wall 142.

The distance of a magazine 110A, 110B from rotational axis 106 is established by contact between raised circular pads 224 (on the bottom of magazine 110A, 110B—see FIG. 5) and raised intersections of ribs 144B and 154B, as shown in FIG. 6.

Along axis 106 spit 100 has provided, on its exterior end walls 142 and on disk-shaped pulley member 143, axle bearing lugs 163 and 164, respectively (see FIG. 4 and FIG. 5). As seen hereinafter (and particularly with reference to FIG. 4), axle bearing lugs 163 and 164 are rotatably retained in portions of storage enclosure 104, particularly in bearing apertures 190, 192.

The pulley member 143 has a toothed perimeter 165 extending orthogonally from its backside plane. On backside plane of pulley member 143 (shown in FIG. 4) are formed the axle lug 163, a plurality of strengtening ribs, anchors for fasteners, and two rectangular apertures 166 symmetrically placed about lug 163. A pulley cover, also known as a pulley flange 204, is secured to member 143 by fasteners 223 as shown in FIG. 4.

Circular pulley member 143 receives, between its backside plane and cover 204, a magazine latch or biasing mechanism 170. As shown in FIG. 4 and FIG. 5, latch mechanism 170 includes two elongated latch plates 220. Each latch plate 220 has a semi-cylindrical protrusion 220A formed thereon. The protrusions 220A extend through apertures 166 formed in member 143. Latch plates 220 are biased inwardly toward magazine 110A, 110B by two leaf springs 221. Each leaf spring 221 has an elongated dimension which extends essentially perpendicularly to an elongated dimension of latch plates 220. That is, an axis of elongation of the latch members 220 is essentially perpendicular to an axis of elongation of the spring members 221. A first end of each leaf spring 221 bears against a first of the latch plates 220, while a second end of each leaf spring bears against a second of the latch plates 220. Leaf springs 221 are centrally affixed to pulley member 143 by fasteners 222.

The perimeter of pulley cover 204 is utilized to determine which magazine 110A, 110B is facing cartridge picker or gripper 80 (i.e., which magazine 110A, 110B has its cartridges lying in presentation plane 70). In this regard, cover 204 has a first perimeter segment 204A which has a greater radius (from axis 106) than second perimeter segment 204B. Thusly formed, the perimeter of cover 204 has two radial notches 204C and 204D. An unillustrated optical sensor is mounted to the interior of the library housing to have an optical beam extending in the Y direction. Pulley cover 204 can be rotated so that first perimeter segment 204A interrupts the optical beam, but the second perimeter segment 204B will not interrupt the beam. Accordingly, library 30 knows which magazine 110A, 110B is in presentation plane 70 (e.g., parallel to the X-Y plane) by determining whether a signal indicative of optical beam transmission is going from high to low or low to high as causes by radial notches 204C, 204D.

Respecting longitudinal positioning of magazine 110 within spit 100 (e.g., along axis 106), upon insertion of magazine 110A, 110B the feet ramps 118 are inserted into grooves 156 and captured by members 155. The crown ramp end of magazine 110A, 110B is then pushed into tray compartment 130B, with crown ramp 117 momentarily pushing semi-cylindrical protrusion 220A of latch plates 220 against biasing springs 221, so that springs momentarily yield as crown ramp 117 slides toward tray floor 132. As magazine 110A, 110B seats within tray 130, crown ramp 117 of magazine 110 travels below protrusion 220A, so that leaf springs 221 push protrusions 220A back toward magazine 110A, 110B and capture crown ramp 117 beneath protrusion 220A. Springs 221 thus serve to provide a locking of magazine 110A, 110B in both a longitudinal direction (along axis 106) and in a radial direction from axis 106.

In the process of installing magazine 110A, 110B in tray compartment 130A, 130B, ribs 144B provide an initial gross centering of magazine 110A, 110B relative to the dimension of spit width SW. Fine centering of magazine 110A, 110B is facilitated by insertion of fin or keel 119 into slot 134.

Storage enclosure 104 includes a rear panel 184; a left end panel 186; and, a right end panel 188. Real panel 184 has two portions 184A and 184B which intersect at an obtuse interior angle. Only panels 184 and 186 are shown in FIG. 1, it being understood that panel 188 has been removed to facilitate viewing. Panels 184, 186, and 188 are shown in exploded position in FIG. 4, where it is understood that these panels are assembled together to form a cavity in which spit 100 is rotatably positioned. As shown in FIG. 4, body end panel 186 has a bearing aperture 190 which rotatably accommodates axle lug 164 of spit 100. Similarly, neck end panel 188 has a bearing aperture 192 which rotatably accommodates axle lug 163 of spit 100. Rear panel portion 184B has a slot 196 formed therein which accommodates extension therethrough of a portion of rotational drive system 102 (specifically, belt 202 as hereinafter discussed).

As shown in FIG. 4, rotational drive system 102 includes drive motor 200; toothed pulley drive belt 202; and the aforementioned pulley flange or cover member 204. A motor bracket 210 is fastened to an underside of rear panel 184B (see FIG. 1), with motor bracket 210 having an arcuate surface to accommodate motor 200. Motor 200 is secured to motor bracket 210 by motor clamp 212. Shaft 214 of motor 200 has pulley drive belt 202 entrained thereabout, pulley drive belt 202 also being entrained about circular rim 165 of spit 100. In spanning motor shaft 214 and spit rim 165, pulley drive belt 202 extends through slot 196 in rear panel 184B (see FIG. 1). Pulley flange 204 is secured to pulley member 143 by fasteners 223 as previously described to maintain drive belt 202 entrained about spit rim 165.

Advantageously, provision of rotatable spit 100 effectively doubles the capacity of library 30 without enlarging the library housing. Unlike rotatable libraries having three or more faces, there is no dead space in library 30 between tray compartments 130A, 130B.

As is understood from the foregoing description, spit 100 of the present invention facilitates storage of twenty rather than ten cartridges within library 30. In terms of dimensions of spit 100 relative to the library housing, spit 100 has a spit width SW (see FIG. 1 and FIG. 4) in a direction perpendicular to but coplanar with spit axis 106. Spit width SW is essentially 0.6 the size of a smallest dimension of the housing (e.g., dimension X of the library 30 of the present embodiment).

Spit motor 200 is adapted to rotate spit 100 only to two positions. In a first position, tray compartment 130A is situated so that protruding edges of cartridges stored in magazine 110A essentially lie in presentation plane 70 flush with bezels of drives 40A, 40B. In a second position, tray compartment 130B is situated so that protruding edges of cartridges stored in magazine 110B essentially lie in presentation plane 70 flush with bezels of drives 40A, 40B. To facilitate viewing, spit 100 has been shown in the drawings as being at a 45 degree inclination to presentation plane 70, but it should be understood that in working use spit 100 only rotates through the 45 degree position and does not pause there.

While library 30 has been shown in the drawings with gripper 80 traveling along direction Y, it should be understood that library 30 can be position "on edge" so that gripper 80 has a vertical rather than a horizontal direction of travel. In such vertical positioning, drives 40A, 40B would be positioned above, rather than to the side of, storage assembly 50.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A rotatable spit for engaging a magazine which accommodates data storage cartridges, the rotatable spit comprising a circular end wall, the circular end wall having a toothed perimeter, the circular end wall having a least a first aperture through which at least a first magazine-capturing protrusion extends, the first protrusion being biased to contact the magazine upon insertion of the magazine into the spit.

2. The spit of claim 1, wherein the end wall has the first magazine-capturing protrusion and a second magazine-capturing protrusion extending respectively through the first aperture and a second aperture formed in the end wall, wherein each of the first magazine-capturing protrusion and the second magazine-capturing protrusion is formed on a corresponding one of two elongated latch members, wherein the end wall has attached thereto two elongated spring members, and wherein an axis of elongation of the latch members is essentially perpendicular to an axis of elongation of the spring members.

3. The spit of claim 1, wherein the end wall is adapted to have a pulley belt entrained thereabout.

4. An automated cartridge library for handling data storage cartridges, the library comprising:

a frame;

a motor mounted on the frame;

an input/output (I/O) drive mounted to the frame;

a rotatable spit mounted to the frame to rotate about a spit axis, the rotatable spit having two mounting surfaces and a spit circular end wall, the two mounting surfaces being a first mounting surface and a second mounting surface, each of the first mounting surface and the second mounting surface accommodating a cartridge magazine, the cartridge magazine being of a type which accommodates a plurality of data storage cartridges, the spit circular end wall having a perimeter and an end wall magazine-oriented surface, the spit end wall magazine-oriented surface being essentially perpendicular to the spit axis, the end wall perimeter being adapted to have rotational motion transmitted thereto from the motor, the spit end wall magazine-oriented surface having a magazine-capturing element connected thereto for selectively retaining the magazine;

wherein the spit circular end wall has an aperture formed therein, wherein the magazine-capturing element extends through the aperture in the spit circular end wall;

a cartridge engagement mechanism mounted to the frame for selectively engaging cartridges and transporting cartridges between the magazine and the I/O drive.

5. The library of claim 4, wherein the perimeter of the spit circular end wall forms a toothed pulley.

6. The library of claim 4, wherein the magazine-capturing element is resiliently biased to contact the magazine upon insertion of the magazine into the spit.

7. The library of claim 4, wherein the magazine-capturing element is connected on the spit end wall magazine-oriented surface within the perimeter.

8. The library of claim 4, further comprising a flange attached to the spit circular end wall, the flange being configured to provide an indication of the relative positioning of the first mounting surface and the second mounting surface.

* * * * *